(12) United States Patent
Pauchet et al.

(10) Patent No.: US 10,310,469 B2
(45) Date of Patent: Jun. 4, 2019

(54) AUTOMATION SYSTEM

(71) Applicant: SCHNEIDER ELECTRIC INDUSTRIES SAS, Rueil Malmaison (FR)

(72) Inventors: Eric Pauchet, Nice (FR); Pascal Chapier, Valbonne (FR)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 99 days.

(21) Appl. No.: 14/912,501

(22) PCT Filed: Sep. 5, 2014

(86) PCT No.: PCT/EP2014/068998
§ 371 (c)(1),
(2) Date: Feb. 17, 2016

(87) PCT Pub. No.: WO2015/036338
PCT Pub. Date: Mar. 19, 2015

(65) Prior Publication Data
US 2016/0202684 A1  Jul. 14, 2016

(30) Foreign Application Priority Data

Sep. 10, 2013 (FR) ..................... 13 58686

(51) Int. Cl.
*G05B 11/01* (2006.01)
*G05B 19/05* (2006.01)
(Continued)

(52) U.S. Cl.
CPC .......... *G05B 19/0426* (2013.01); *G05B 11/01* (2013.01); *G05B 19/0428* (2013.01);
(Continued)

(58) Field of Classification Search
CPC .......................... G05B 11/01; G05B 19/0421; G05B 19/0426; G05B 19/0428; G05B 19/052;
(Continued)

(56) References Cited

U.S. PATENT DOCUMENTS 4,015,548 A * 4/1977 Schuss .................... F23N 1/082
110/101 C
4,228,496 A  10/1980 Katzman et al.
(Continued)

FOREIGN PATENT DOCUMENTS

EP  0 262 923 A2  4/1988

OTHER PUBLICATIONS

International Search Report dated Oct. 29, 2014 in PCT/EP2014/068998 filed Sep. 5, 2014.

*Primary Examiner* — Jennifer L Norton
(74) *Attorney, Agent, or Firm* — Oblon, McClelland, Maier & Neustadt, L.L.P.

(57) ABSTRACT

An automation system made through a communication network and including: a first and second programmable logic controller respectively executing first and second automation applications to respectively control first and second sets of associated input/output modules; a third programmable logic controller, including a storage storing the first and second automation applications and configured to execute the first automation application to stand in for the first programmable logic controller, or to execute the second automation application to stand in for the second programmable logic controller.

7 Claims, 2 Drawing Sheets

(51) Int. Cl.
  *G06F 11/20* (2006.01)
  *G05B 19/042* (2006.01)
(52) U.S. Cl.
  CPC ........ *G05B 19/052* (2013.01); *G06F 11/2028* (2013.01); *G06F 11/2038* (2013.01); *G05B 19/0421* (2013.01); *G05B 2219/13004* (2013.01); *G05B 2219/24192* (2013.01)
(58) Field of Classification Search
  CPC ........... G05B 2219/13004; G05B 2219/24192; G06F 11/1675; G06F 11/203; G06F 11/2033; G06F 11/2097; G06F 11/2028; G06F 11/2038
  See application file for complete search history.

(56) References Cited

U.S. PATENT DOCUMENTS

| | | | |
|---|---|---|---|
| 4,347,563 A * | 8/1982 | Paredes | G05B 19/0428 700/8 |
| 4,356,550 A | 10/1982 | Katzman et al. | |
| 4,365,295 A | 12/1982 | Katzman et al. | |
| 4,378,588 A | 3/1983 | Katzman et al. | |
| 4,484,275 A | 11/1984 | Katzman et al. | |
| 4,521,871 A | 6/1985 | Galdun et al. | |
| 4,635,184 A * | 1/1987 | Schuss | G05B 19/4184 700/82 |
| 4,639,864 A | 1/1987 | Katzman et al. | |
| 4,672,535 A | 6/1987 | Katzman et al. | |
| 4,672,537 A | 6/1987 | Katzman et al. | |
| 4,797,884 A | 1/1989 | Yalowitz et al. | |
| 4,807,116 A | 2/1989 | Katzman et al. | |
| 4,817,091 A | 3/1989 | Katzman et al. | |
| 4,858,101 A * | 8/1989 | Stewart | G05B 19/052 700/2 |
| 4,959,768 A | 9/1990 | Gerhart | |
| 5,313,386 A | 5/1994 | Cook et al. | |
| 5,392,424 A * | 2/1995 | Cook | G05B 19/058 714/49 |
| 5,464,435 A | 11/1995 | Neumann | |
| 5,966,301 A | 10/1999 | Cook et al. | |
| 6,615,091 B1 * | 9/2003 | Birchenough | B65G 37/02 700/20 |
| 9,897,990 B2 * | 2/2018 | Papenbreer | G05B 19/048 |
| 9,934,111 B2 * | 4/2018 | Bibelhausen | G05B 19/0428 |
| 2003/0115500 A1 | 6/2003 | Akrout et al. | |
| 2007/0073912 A1 * | 3/2007 | Ozaki | G05B 19/054 710/8 |
| 2008/0162738 A1 * | 7/2008 | Apel | G06F 9/4411 710/11 |
| 2010/0174387 A1 * | 7/2010 | Ono | G05B 19/05 700/23 |
| 2013/0131839 A1 | 5/2013 | Washington et al. | |
| 2018/0365184 A1 * | 12/2018 | van Wensen | G06F 13/364 |

* cited by examiner

AUTOMATION SYSTEM

TECHNICAL FIELD OF THE INVENTION

The present invention relates to an automation system comprising multiple programmable logic controllers connected to a communication network.

PRIOR ART

In a known manner, a programmable logic controller (PLC) is tasked with executing its own automation application so as to control a set of input/output modules. The programmable logic controller reads data sent to the input modules and writes data to the output modules. The input modules are, for example, connected to sensors and the output modules are, for example, connected to actuators.

An automation system may comprise multiple programmable logic controllers, called primary programmable logic controllers, connected to each other over a communication network. The sets of input/output modules, each controlled by a separate programmable logic controller, are also connected to this communication network.

In the prior art, a backup programmable logic controller is associated with each primary programmable logic controller of the network in order to be able to stand in for it in the event that it is voluntarily or involuntarily taken out of service. Being taken out of service can occur for various reasons such as, for example, a fault, a power cut, maintenance, replacement or updating of software and/or hardware. Once in service, the backup programmable logic controller controls the set of input/output modules associated with the primary programmable logic controller that it replaces.

The automation architecture is therefore especially cumbersome and expensive, as it requires the provision of a backup programmable logic controller for each primary programmable logic controller.

Another solution is described in the document U.S. Pat. No. 4,672,537. This solution has the drawback that all of the modules of the multiprocessor system are in operation and that when one of them breaks down, the system is deprived of a module, thereby reducing its performance.

The aim of the invention is to propose an automation system having an architecture that is simplified with respect to the prior art, less expensive and easy to implement and making it possible to keep the system in the same operating configuration and at the same level of performance.

SUMMARY OF THE INVENTION

This aim is achieved using an automation system implemented through a communication network and comprising at least:
- a first programmable logic controller connected to said communication network and designed to execute a first automation application,
- a first set of input/output modules controlled by the first programmable logic controller through the communication network,
- a second programmable logic controller connected to said communication network and designed to execute a second automation application,
- a second set of input/output modules controlled by the second programmable logic controller through the communication network,
- a third programmable logic controller, called backup programmable logic controller, connected to said communication network and designed to stand in for the first programmable logic controller or the second programmable logic controller when taken out of service, the backup programmable logic controller comprising storage means storing both the first automation application and the second automation application and being designed to execute the first automation application for the purpose of standing in for the first programmable logic controller and controlling the first set of input/output modules, or to execute the second automation application for the purpose of standing in for the second programmable logic controller and controlling the second set of input/output modules.

With respect to the prior art, the system comprises a backup programmable logic controller which is activated only when one of the primary programmable controllers breaks down, thereby making it possible to ensure a reliable and functional solution in the event of failure of one of these primary programmable logic controllers. The system hence always maintains the same number of active programmable logic controllers.

Furthermore, the solution of the invention employs only one backup programmable logic controller, as the latter stores the automation applications of all of the other logic controllers of the system, making it possible for it to stand in for any of the primary programmable logic controllers.

According to one specific feature, the first programmable logic controller and the second programmable logic controller are connected to the backup programmable logic controller by a monitoring link.

According to another specific feature, the backup programmable logic controller comprises means for detecting the taking out of service of the first programmable logic controller or of the second programmable logic controller.

According to another specific feature, the first programmable logic controller and the second programmable logic controller each comprise means for generating an image representative of an internal state and are designed to send this state to the backup programmable logic controller through the monitoring link.

According to another specific feature, the first programmable logic controller stores the first automation application and the second automation application in a mass memory.

According to another specific feature, the second programmable logic controller stores the first automation application and the second automation application in a mass memory.

BRIEF DESCRIPTION OF THE FIGURES

Other features and advantages will become apparent in the detailed description that follows, which makes reference to the following appended drawings.

DETAILED DESCRIPTION OF AT LEAST ONE EMBODIMENT

Figure 1:
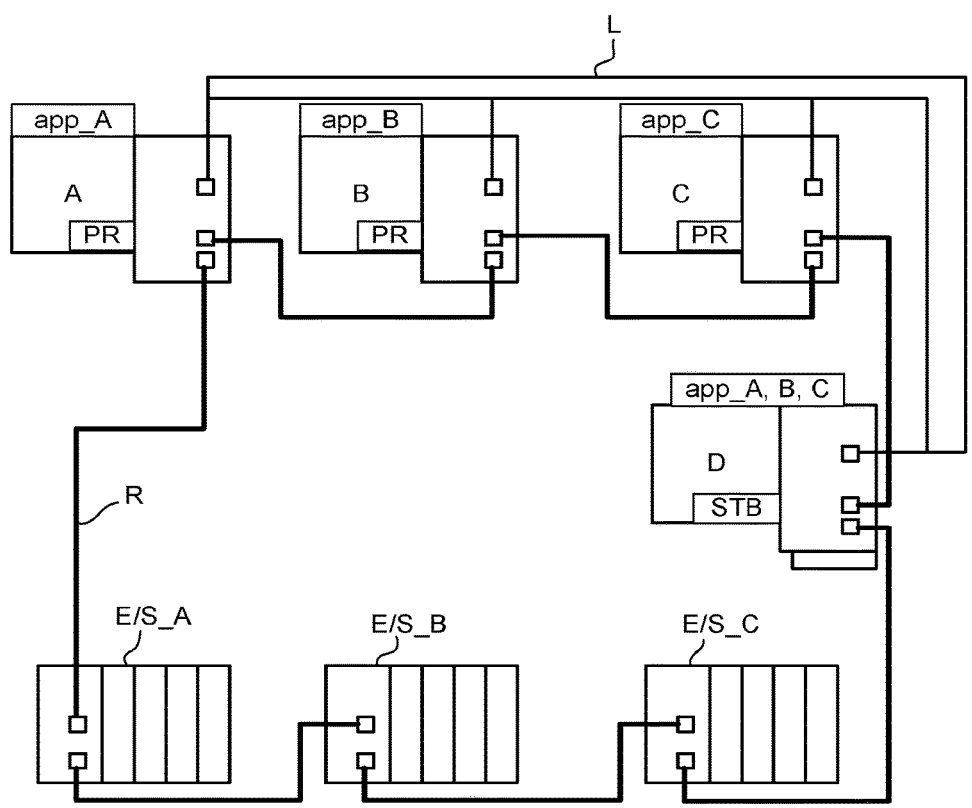
FIGS. 1, 2 and 3 show the automation system of the invention and illustrate the operating principle of this automation system.

The invention relates to an automation system comprising multiple programmable logic controllers A, B, C, called primary programmable logic controllers (denoted by PR in the drawings), interconnected over a communication network R. A set of input/output modules E/S_A, E/S_B, E/S_C is associated with each primary programmable logic controller. The sets of input/output modules E/S_A, E/S_B, E/S_C are preferably removed with respect to their respective programmable logic controller A, B, C and are connected to the communication network. Each programmable logic controller A, B, C executes a specific automation application for controlling its input/output modules. Each programmable logic controller controls its set of input/output modules through the communication network R. The automation system may be wired according to a ring or star topology. In the rest of the description and in the figures, the example of a ring network architecture is used, but it should be understood that the invention may be applied to a star network architecture or to any other type of network architecture.

In FIG. 1, an automation system comprising three primary programmable logic controllers A, B, C and three sets of input/output modules E/S_A, E/S_B, E/S_C is considered, each set of input/output modules being associated with a separate programmable logic controller A, B, C. Of course, the number of controllers chosen is not limiting and the invention is applicable to any automation system comprising more than two programmable logic controllers.

The programmable logic controller A executes a first automation application app_A and controls a first set of input/output modules E/S_A, the programmable logic controller B executes a second automation application app_B and controls a second set of input/output modules E/S_B and the programmable logic controller C executes a third automation application app_C and controls a third set of input/output modules E/S_C.

According to the invention, the automation system also comprises a programmable logic controller D called backup programmable logic controller (denoted by STB in the drawings). This backup programmable logic controller D is intended to stand in for any of the primary programmable logic controllers A, B or C if one of them is out of service. There are many possible causes for being taken out of service. These may be, for example, a power cut, a fault, a shutdown for updating or for maintenance, etc. The backup programmable logic controller is inactive as long as the primary programmable logic controllers are in working order. It can become active only when one of the primary programmable logic controllers breaks down. By replacing a primary programmable logic controller which has broken down with the backup programmable logic controller, the system always maintains the same number of active controllers.

The backup programmable logic controller D is also connected to the communication network R so as to be able to communicate with the primary programmable logic controllers A, B, C and the sets of input/output modules E/S_A, E/S_B, E/S_C of the system. Furthermore, the primary programmable logic controllers A, B, C are also connected to the backup programmable logic controller D by a monitoring link L, which is separate from the communication network R.

A first type of signal is exchanged over the communication network R to make it possible for each primary programmable logic controller A, B or C to communicate with its set of input/output modules E/S_A, E/S_B, E/S_C. A second type of signal is sent over the monitoring link L by each primary programmable logic controller A, B, C to the backup programmable logic controller D in order to keep it permanently informed of its state. In each cycle, the primary programmable logic controller A, B, C constructs an image of its internal state and sends this state to the backup programmable logic controller over the monitoring link L.

The backup programmable logic controller D stores the states received from the different primary programmable logic controllers A, B, C.

In order to be able to stand in for any of the primary programmable logic controllers A, B or C of the system, the backup programmable logic controller D permanently stores all of the automation applications app_A, app_B, app_C executed by the primary programmable logic controllers A, B, C of the system. The applications of the primary programmable logic controllers A, B, C are stored in the RAM of the backup programmable logic controller D in order to be executable immediately following detection, over the monitoring link L, that a primary programmable logic controller A, B or C of the network has been taken out of service. As soon as it detects that a primary programmable logic controller A, B or C has been taken out of service, the backup programmable logic controller D selects the application of the out-of-service programmable logic controller and immediately executes it by taking control, through the communication network, of the set of input/output modules that is associated with the out-of-service programmable logic controller.

The backup programmable logic controller is intended to detect instances of the primary programmable logic controllers of the network being taken out of service. A primary programmable logic controller A, B or C is considered to be out of service when it no longer communicates with the backup programmable logic controller D, either over the communication network R or over the monitoring link L.

When the backup programmable logic controller D detects that a primary programmable logic controller A, B or C has been taken out of service, it selects, in its memory, the application of this primary programmable logic controller and executes it. It also takes control of the set of input/output modules of the programmable logic controller that has been replaced. The application to be executed is identified in the frames exchanged over the communication network and over the monitoring link.

Once the backup programmable logic controller D has replaced the out-of-service primary programmable logic controller A, B or C, a new programmable logic controller must become the backup programmable logic controller. The primary programmable logic controllers of the system monitor the commissioning of the new backup programmable logic controller in order to be able to send it their state over the monitoring line, as previously described. Preferably, once restored, it is the programmable logic controller (B in FIG. 2) that was out of service which becomes the new backup programmable logic controller for all of the primary programmable logic controllers of the system. Preferably, each programmable logic controller of the system stores, in a mass memory (e.g. flash memory or ROM), the automation applications of all of the programmable logic controllers of the system, thereby making it possible for each programmable logic controller to have all of the automation applications if it is required to become the backup programmable logic controller of the system. In a variant implementation, the new backup programmable logic controller is, for example, required to download all of the automation applications of the primary programmable logic controllers of the system from a remote server.

Figure 2:
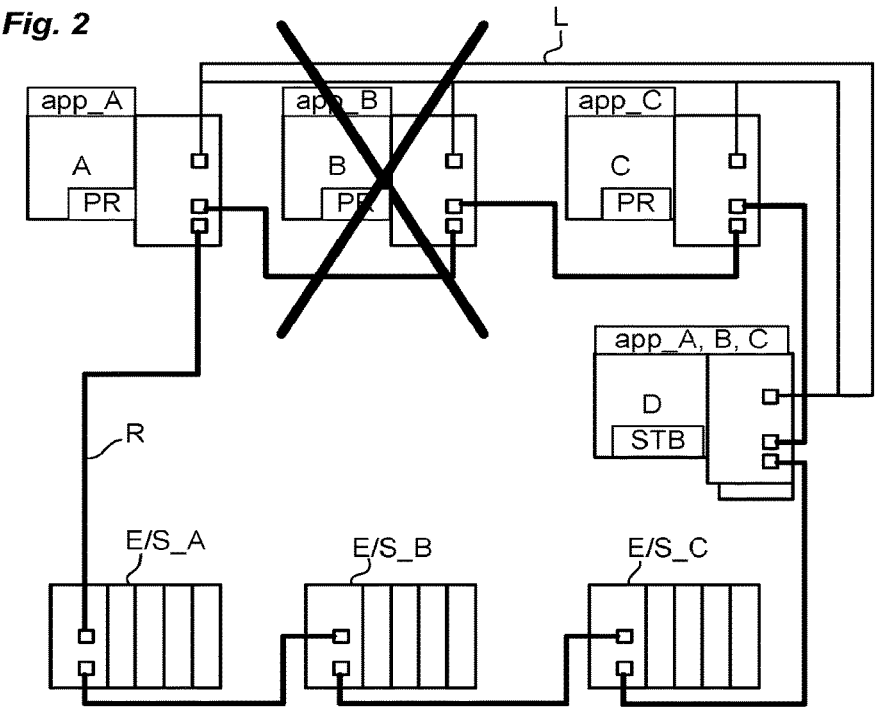
Figure 3:
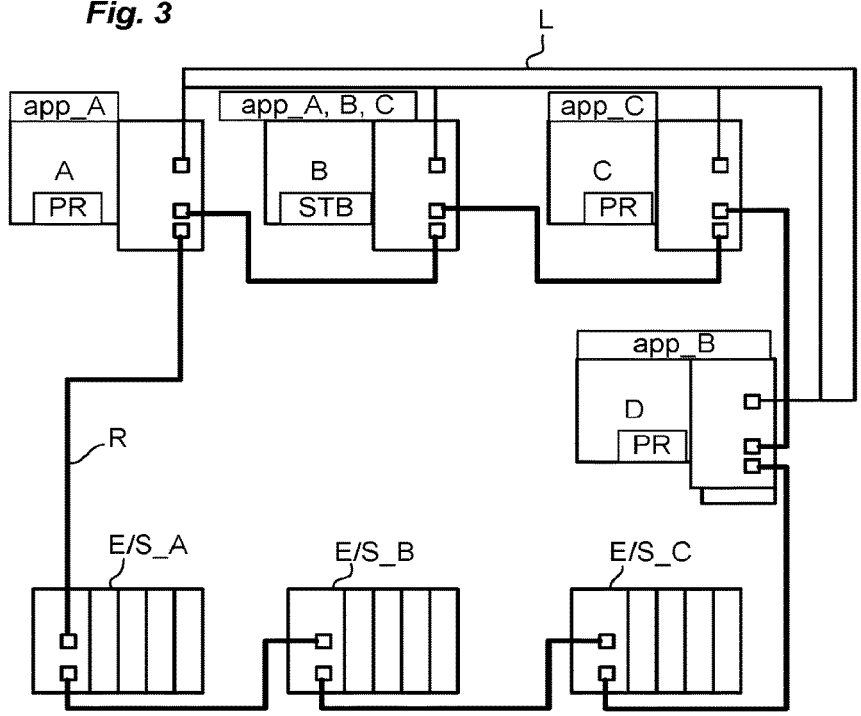

In FIG. 2, the primary programmable logic controller B breaks down. The backup programmable logic controller D replaces the primary programmable logic controller B which has broken down and thus becomes a primary programmable logic controller (PR). It thus executes the application app_B already present in the RAM and takes control of the set of input/output modules E/S_B that is associated with the primary programmable logic controller B. In FIG. 3, the primary programmable logic controller B becomes the new backup programmable logic controller (STB) and has, in memory, applications app_A, app_B and app_C of the 5 programmable logic controllers of the system.

The invention claimed is:

1. An automation system implemented through a communication network and comprising:
   a first programmable logic controller connected to the communication network and configured to execute a first automation application;
   a first set of input/output modules controlled by the first programmable logic controller through the communication network;
   a second programmable logic controller connected to the communication network and configured to execute a second automation application;
   a second set of input/output modules controlled by the second programmable logic controller through the communication network; and
   a third programmable logic controller, as a backup programmable logic controller, connected to the communication network and configured to:
      detect, using a dedicated monitoring link directly connected to the third programmable logic controller and each of the first and second programmable logic controllers, when one or both of the first programmable logic controller and the second programmable logic controller are taken out of service, and
      respectively stand in for one or both the first programmable logic controller and the second programmable logic controller in response to the detection that one or both of the first programmable logic controller and the second programmable logic controller are taken out of service,
   wherein the third programmable logic controller as the backup programmable logic controller is inactive until the detection that one or both of the first programmable logic controller and the second programmable logic controller are taken out of service,
   wherein the dedicated monitoring link is distinct from the communication network,
   wherein the third programmable logic controller as the backup programmable logic controller includes memory configured to store both the first automation application and the second automation application, and, upon activation, is configured to:
      execute the first automation application to stand in for the first programmable logic controller and control the first set of input/output modules responsive to the detection that the first programmable logic controller is taken out of service, and
      execute the second automation application to stand in for the second programmable logic controller and control the second set of input/output modules responsive to the detection that the second programmable logic controller is taken out of service,
   wherein each of the first and second programmable logic controllers is configured to serve as the backup programmable logic controller when the third programmable logic controller is not serving as the backup programmable logic controller, and
   wherein the automation system has only one backup programmable logic controller active at any one time.

2. The system as claimed in claim 1, wherein the first programmable logic controller and the second programmable logic controller are connected to the backup programmable logic controller by the dedicated monitoring link.

3. The system as claimed in claim 2, wherein the backup programmable logic controller is configured to detect taking out of service of the first programmable logic controller or of the second programmable logic controller.

4. The system as claimed in claim 2, wherein each of the first programmable logic controller and the second programmable logic controller is configured to generate an image representative of an internal state and being configured to send data corresponding to the internal state to the backup programmable logic controller through the dedicated monitoring link.

5. The system as claimed in claim 1, wherein the first programmable logic controller stores the first automation application and the second automation application in a mass memory.

6. The system as claimed in claim 1, wherein the second programmable logic controller stores the first automation application and the second automation application in a mass memory.

7. The system as claimed in claim 1,
   wherein one of the first or the second programmable logic controllers that was taken out of service becomes the only one backup programmable logic controller when the third programmable logic controller is active and not serving as the backup programmable logic controller, and
   wherein said one of the first or the second programmable logic controllers now serving as the backup programmable logic controller is inactive and configured to respectively stand in for one or both of the third programmable logic controller and the other of the first or the second programmable logic controllers not taken out of service in response to detection that one or both of third programmable logic controller and the other of the first or the second programmable logic controllers are taken out of service.

* * * * *